United States Patent [19]

Kerlin

[11] Patent Number: 4,644,123
[45] Date of Patent: Feb. 17, 1987

[54] ROTARY BALANCING APPARATUS

[76] Inventor: Jack H. Kerlin, 1722 Sanford Pl., Ann Arbor, Mich. 48103

[21] Appl. No.: 651,745

[22] Filed: Sep. 18, 1984

[51] Int. Cl.$^4$ ................................................ B23K 9/00
[52] U.S. Cl. ........................................ 219/68; 73/460; 219/130.4; 307/112
[58] Field of Search ................... 219/69 P, 69 M, 68, 219/130.4; 73/460; 307/112, 132 R, 132 M

[56] References Cited

U.S. PATENT DOCUMENTS

| | | | |
|---|---|---|---|
| 2,322,561 | 6/1943 | Blevins et al. | 219/69 M |
| 2,867,730 | 1/1959 | Welch | 219/130.4 |
| 2,895,080 | 7/1959 | Branker | 219/69 P |
| 3,259,729 | 7/1966 | Murtz et al. | 219/68 |

Primary Examiner—Clifford C. Shaw
Attorney, Agent, or Firm—Rhodes and Boller

[57] ABSTRACT

Balancing apparatus for performing in-process balancing of a rotary mass by capacitor discharge to deliver an arc to erode material from the mass. A capacitor bank is operatively coupled through a coupling circuit to electrode structure which delivers the arc to the mass. A trigger pulse is injected into the coupling circuit to initiate the arc discharge. The coupling circuit is so constructed and arranged as not to impair the effectiveness of the trigger pulse in initiating the arc, yet it provides no significant resistance to the high amperage capacitor discharge current which is enabled to flow to the electrodes once the gap between the electrode structure and the rotary mass has been broken down. Several embodiments of the invention are disclosed. One embodiment comprises multiple capacitor banks which are sequentially placed on-line. Associated with each capacitor bank is a "contactless switch". The contactless switch comprises a pair of contacts, preferably graphite blocks, having confronting faces forming a gap between them. A branch circuit shunts this gap and is selectively operable to selectively allow and disallow the gap to be broken down by the same trigger pulse that initiates the arc and in this way selectively allow and disallow the capacitor from discharging. When a capacitor bank is off-line it is recharged.

21 Claims, 5 Drawing Figures

ROTARY BALANCING APPARATUS

BACKGROUND AND SUMMARY OF THE INVENTION

This invention relates generally to in-process balancing of a rotating mass by the creation of an electric arc across an air gap which erodes material from the mass. More specifically the invention involves a new and improved means to initiate and maintain the electric arc discharges which erode the material.

In recent years advances in electronic vibration measurement equipment have made possible accurate determination of the amount and location of minute unbalance in rotating elements such as gyroscope rotors and small turbine wheels. Such rotating elements are often required to be balanced to levels approaching the limits of the measuring equipment. But while it is possible to electronically measure the quantity of material creating unbalance, no means has yet been devised for physically removing the exact minute amounts indicated. Consequently, trial and error correction is employed. An estimated amount of stock is removed manually by milling, grinding, or by electrochemical methods. Unbalance is then measured to determine the effect of the correction and how much unbalance remains. This two-step process of alternate correction and measurement continues until an acceptable state of balance is attained.

Ideally, correction should occur simultaneously with measurement in a single operation. By continuously monitoring the effect of gradual stock removal lower levels of unbalance can be achieved in less time.

Rotating elements not requiring critical balancing would also benefit from such an ideal in-process balancing system in cases where controlled stock removal methods such as drilling or welding metal strip are not suitable. Even when controlled correction methods are utilized, in-process balancing may function for trim balancing to a precision not otherwise attainable except by the trial and error method previously described.

The present invention in general relates to a new and improved unbalance correction system wherein correction is attained by electric arc discharge through a heavy spot on a rotating mass to remove material from the heavy spot by vaporization.

The concept of starting an arc with a superimposed high voltage has long been utilized in automatic arc welding equipment. As applied in the balancing field the principle is found in prior art U.S. Pat. No. 2,322,561 which indicates use of high voltage to initiate a low voltage capacitor discharge across an air gap for stock removal purposes.

One aspect of the present invention involves in-process correction of unbalance by means of periodic electrical discharges occurring between stationary electrodes and a workpiece rotating in a balancing machine of conventional design. Heat generated by the high-current arc so formed melts and vaporizes stock from the heavy spot of the workpiece. Each discharge results in an incremental reduction of unbalance and proceeds automatically to a minimal level of unbalance. The residual unbalance corresponds at most to the amount of material removed per discharge. Unbalance will never exceed this minimal level because the location of unbalance will change as soon as over-correction occurs. Thus it is impossible to over-shoot, and the system is inherently self-limiting once the minimal level is reached.

In one embodiment, two electrodes are positioned in close proximity to the workpiece and to each other. The electrodes are designated positive and negative and are connected via a heavy cable to positive and negative terminals respectively of a capacitor bank. An electrical circuit is completed from the positive to the negative electrode by imposition of the workpiece which functions as an intermediate passive conductor. This circuit comprises the workpiece and the air gap which exists on opposite sides of the workpiece, the electrodes being spaced from the workpiece.

Discharge of the capacitor bank occurs in response to a signal from the balancing machine's electronic vibration measurement instrument. This signal is synchronous with vibration from the unbalanced workpiece and is phase adjustable to time the discharge when the heavy spot is immediately adjacent the electrodes.

Initial breakdown of the gap typically requires over 10,000 volts. The capacitors of the capacitor bank however are typically charged to only several hundred volts. Once breakdown of the gap has been initiated, only about 50 volts is required across the gap to sustain the high current flow. Breakdown is initiated by superimposing a high breakdown voltage upon the low-voltage/high-current main arc circuit to establish an ionized path across the gap. The invention provides a means for developing and applying such a high voltage to the gap to initiate breakdown and allow for the subsequent discharge of the capacitors to sustain and augment the electric arc. Once started the discharge is self-sustaining until the capacitor bank charge voltage is lowered to the gap-maintaining potential of about 50 volts.

The invention, in its broader aspects, contemplates both single and multiple capacitor banks. Where only a single capacitor bank is used, a repeat cycle timer can permit arc discharges to occur at spaced time intervals, rather than once per revolution, to allow re-charging time for the capacitor bank.

A more specific aspect of the invention relates to the use of multiple capacitor banks to improve the operating efficiency.

All capacitors have an ESR (Equivalent Series Resistance) rating. This value, expressed in ohms, is typically so small as to be negligible under ordinary conditions. ESR is the result of capacitor dielectric losses (hysteresis) developed in an alternating electric field. Since these losses are manifest as heat, capacitors subject to large ripple currents undergo a significant temperature rise. The heat generated in watts is equal to $(I_R)^2$ (ESR) where $I_R$ is the ripple current. At some temperature the dielectric begins to break down, accelerating losses and heat buildup until the capacitor is permanently damaged.

In a capacitor discharge system extreme fluctuations in voltage occurring during each charge/discharge cycle represent a detrimental "ripple current". Ripple current is proportional to charge voltage, capacitance and discharge frequency. If voltage and/or capacitance are increased, the repetition rate (discharge frequency) must be decreased to avoid capacitor damage. Consequently the rate of unbalance correction is determined by ripple current heating limitations.

One obvious solution would be to sequentially switch a plurality of capacitor banks, each bank operating within the restrictions stated above. However, conventional switch gear capable of switching the high currents involved (20,000 amps) would be so large as to render the system impractical.

One feature of this invention is to provide a means for sequentially switching two or more banks of capacitors without employing large switch gear usually associated with currents of this magnitude.

In brief, a plurality of capacitor banks are connected in parallel via "gap switches" with the unbalance correction electrode circuit. Rate of unbalance correction is thereby increased proportional to the number of capacitor banks. For example, a 4-bank system can have an overall repetition rate four times that of a single bank system.

As an ancillary benefit the gap switches isolate the charged capacitors from the electrode circuit so that the electrode area where loading and unloading of parts takes place is not exposed to electrified electrodes connected directly to charged capacitors.

The so-called "gap switches" comprise a specific feature of this invention. They permit switching very high currents without moving parts such as found in conventional switches. The gap switch functions as a "contactless contact" to turn on a current. Once turned on current will continue to flow until the gap switch voltage falls below about 30 volts. Without means for turn-off, except as noted above, the gap switch is useful only in A.C. or periodic discharge circuits. In functional terms the gap switch is similar to an SCR (Silicon Controlled Rectifier). SCR's, however, cannot be utilized due to the destructive high voltages required to trigger capacitor discharge.

The disclosed construction of the gap switches represents further attributes of the invention, as will be seen from the ensuing detailed description of the preferred embodiment.

The foregoing features, advantages and benefits of the invention, in its several aspects, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
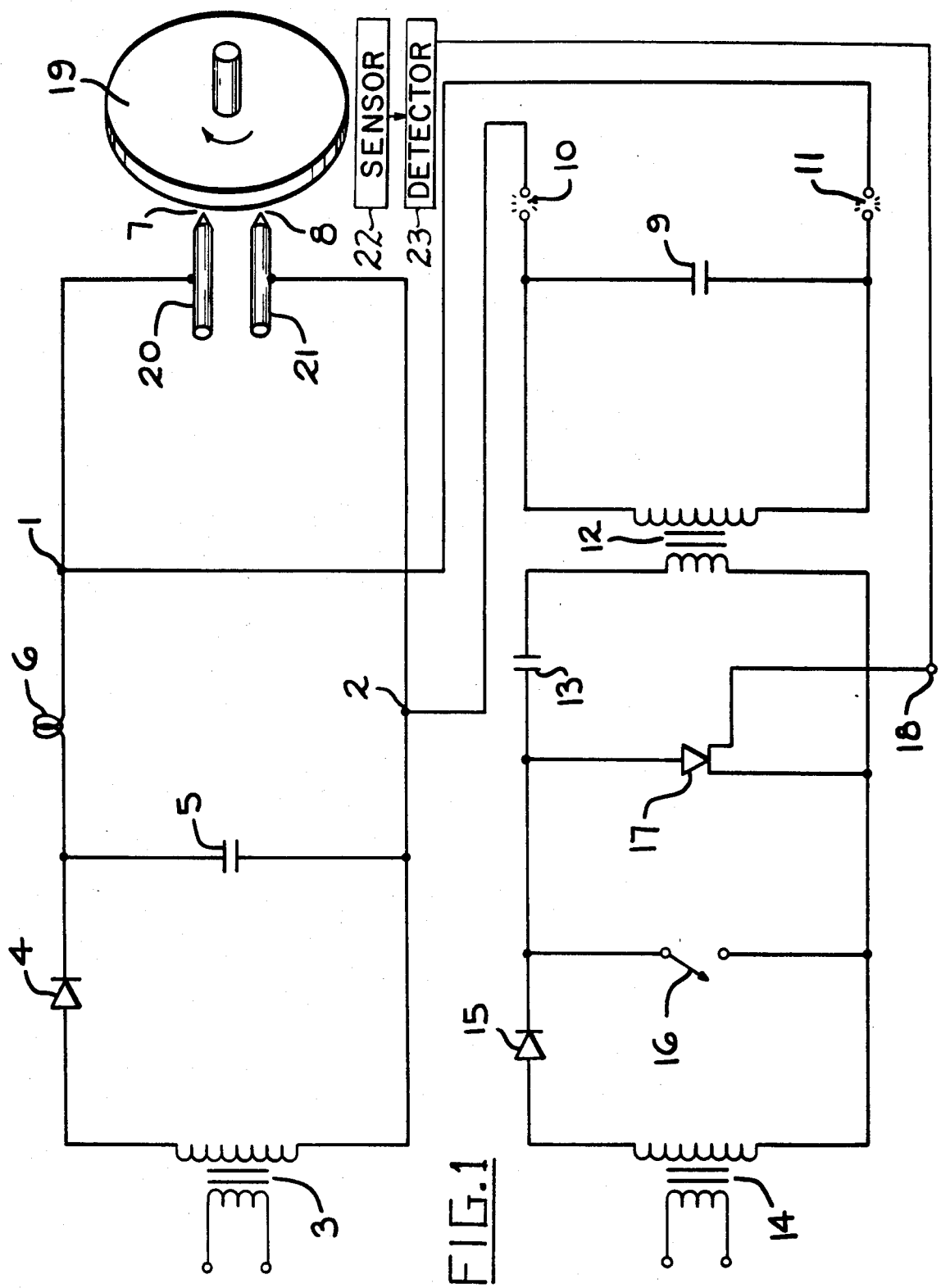
FIG. 1 is an electrical schematic diagram illustrating principles of the present invention in one particular embodiment.

Reference to FIG. 1 shows an electric arc unbalance correction system embodying principles of the present invention.

In principle, a high voltage, high frequency pulse is injected directly into a main discharge circuit at points 1 and 2. The main discharge circuit comprises a charging transformer 3, a rectifier 4, a capacitor bank 5, an inductor coil 6, work gaps 7 and 8, and a workpiece 19. The workpiece is rotatable about an axis of rotation as indicated by the drawing figure.

A portion of the injected pulse current is compelled to complete a circuit across work gaps 7 and 8 rather than short circuit through the power supply provided by capacitor 5. Such short circuiting is inhibited because inductor coil 6 is formed from only several turns of heavy conductor and placed in series with capacitor 5 and gaps 7 and 8, specifically being interposed between capacitor 5 and the point of pulse injection at 1. Due to the high frequency of the pulse, the relatively low self-inductance of coil 6 is sufficient to block or "choke" a portion of the pulse current. Self-inductance of coil 6 must be kept low to prevent choking a rapid discharge of capacitor 5, to minimize voltage reversal of capacitor 5, and to eliminate resistance damping otherwise necessary to avoid voltage reversal.

The high frequency pulse is generated by an arc discharge initiating circuit which comprises a low capacitance capacitor 9 as well as a pair of gaps 10 and 11 in the conductors leading to points 1 and 2. Capacitor 9 is charged to the combined breakdown voltage of gaps 10, 11, 7 and 8, typically about 20,000 volts. Upon breakdown, capacitor 9 discharges through the circuit containing gaps 10, 11, 7, 8. The combined low capacitance and low inductance of this circuit gives it a natural high-frequency of oscillation to thereby produce a current of such high frequency as to be effectively blocked by inductor coil 6.

In a preferred embodiment of the invention capacitor 9 is charged by a high voltage transformer 12. In order to create discrete high voltage/high frequency pulses, transformer 12 is pulsed by discharging a capacitor 13 through the primary of transformer 12. Discharge of capacitor 13 may be controlled by a manual switch 16 or an SCR 17 triggered by a signal input 18 from the balancing instrument. Capacitor 13 is itself charged by a transformer 14 via a rectifier 15.

Electrodes 20 and 21 obviate the necessity of electrifying the workpiece 19 as would be the case if only a single electrode were used per balancing plane. For two plane balancing two sets of dual electrodes are employed.

Based upon this description of FIG. 1 it can be appreciated that capacitor bank 5 is repetitively discharged and recharged during the operation of the system. The recharging of capacitor bank 5 takes place from transformer 3 via diode 4. Recharging of the capacitor bank may require a time interval longer than one revolution of workpiece 19. Hence, the discharge across gaps 7 and 8 to remove material from workpiece 19 may, and indeed most likely will, occur on a basis other than once per revolution. Because the voltage to which capacitor bank 5 is charged is less than the voltage required to breakdown gaps 7 and 8, the only means of initiating the discharge is via the arc discharge initiating circuit.

Where workpiece 19 is provided with a heavy spot, the system operates so that the electric arc discharge is effective on the heavy spot to vaporize a certain amount of material from the heavy spot for each discharge of capacitor bank 5. The balancing instrument may contain a sensor 22 and a detector 23 which is so adjusted that the phase of the trigger signal applied to terminal 18 is delivered at the appropriate time to cause the arc discharge to occur across the heavy spot. A timer or other means may be associated with the control to prevent triggering signals from being given by the arc initiating circuit every rotation of workpiece 19, but this will depend upon how rapidly capacitor bank 5 can be recharged in relation to the speed of rotation of the workpiece. The system operates such that a certain amount of material is removed from the workpiece each time that an arc discharge occurs.

By providing the workpiece with a heavy spot, there will be a noticeable change in the location, or phase, of imbalance as the removal of material from the heavy spot passes through a condition of balance. When this occurs, the balancing instrument detects it and is operable to terminate further arc discharges. Because each arc discharge is effective to remove a certain amount of material from the workpiece, the system provides a result whereby the final amount of imbalance will be at most the amount of material which is vaporized by one arc discharge. This can be very small so that a high degree of balance is achieved. Hence, the trial and error procedure referred to above in prior techniques may be eliminated.

Figure 2:
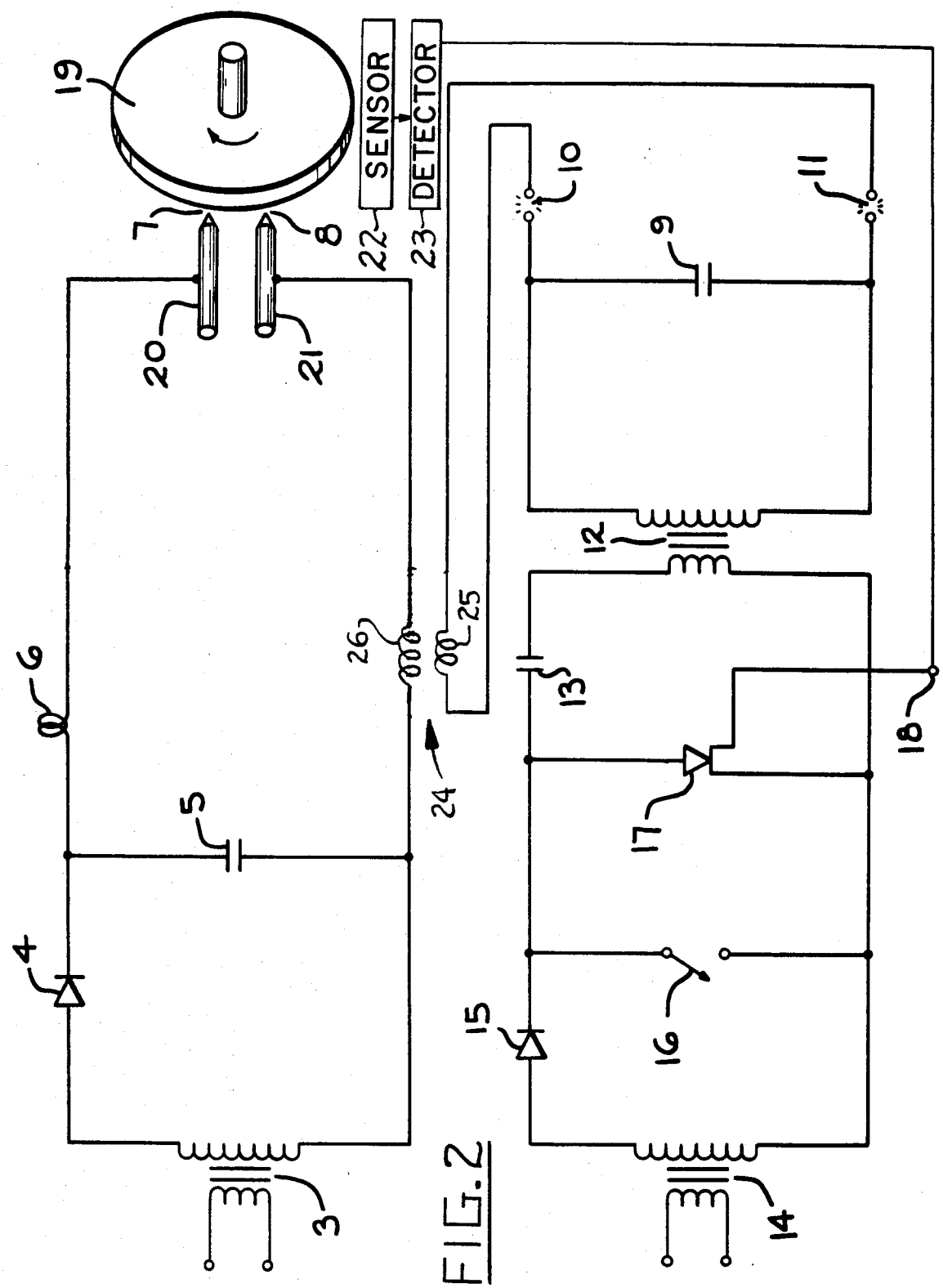
FIG. 2 is an electrical schematic diagram illustrating principles of the present invention in another embodiment.

FIG. 2 illustrates another embodiment containing principles of the present invention. In this embodiment an air core transformer 24 serves to couple the arc discharge initiation circuit with the main discharge circuit from capacitor bank 5 to the electrodes.

The arc discharge initiation circuit is effective on the primary 25, when activated by the balancing instrument, to cause the high-voltage, high-frequency pulse to be induced in the secondary winding 26 of the transformer so as to appear across the electrodes 20, 21. The operation of the circuit is the same as that described above for the embodiment of FIG. 1 in that each arc discharge is effective to vaporize a certain amount of the heavy spot. The air core transformer version is useful in that capacitor bank 5 appears substantially as a dead short to the pulse so that substantially all of the pulse is caused to appear across electrodes 20 and 21. The secondary has a low resistance, low inductance, like inductor coil 6 of FIG. 1 so as not to impede the main discharge from capacitor bank 5.

Figure 3:
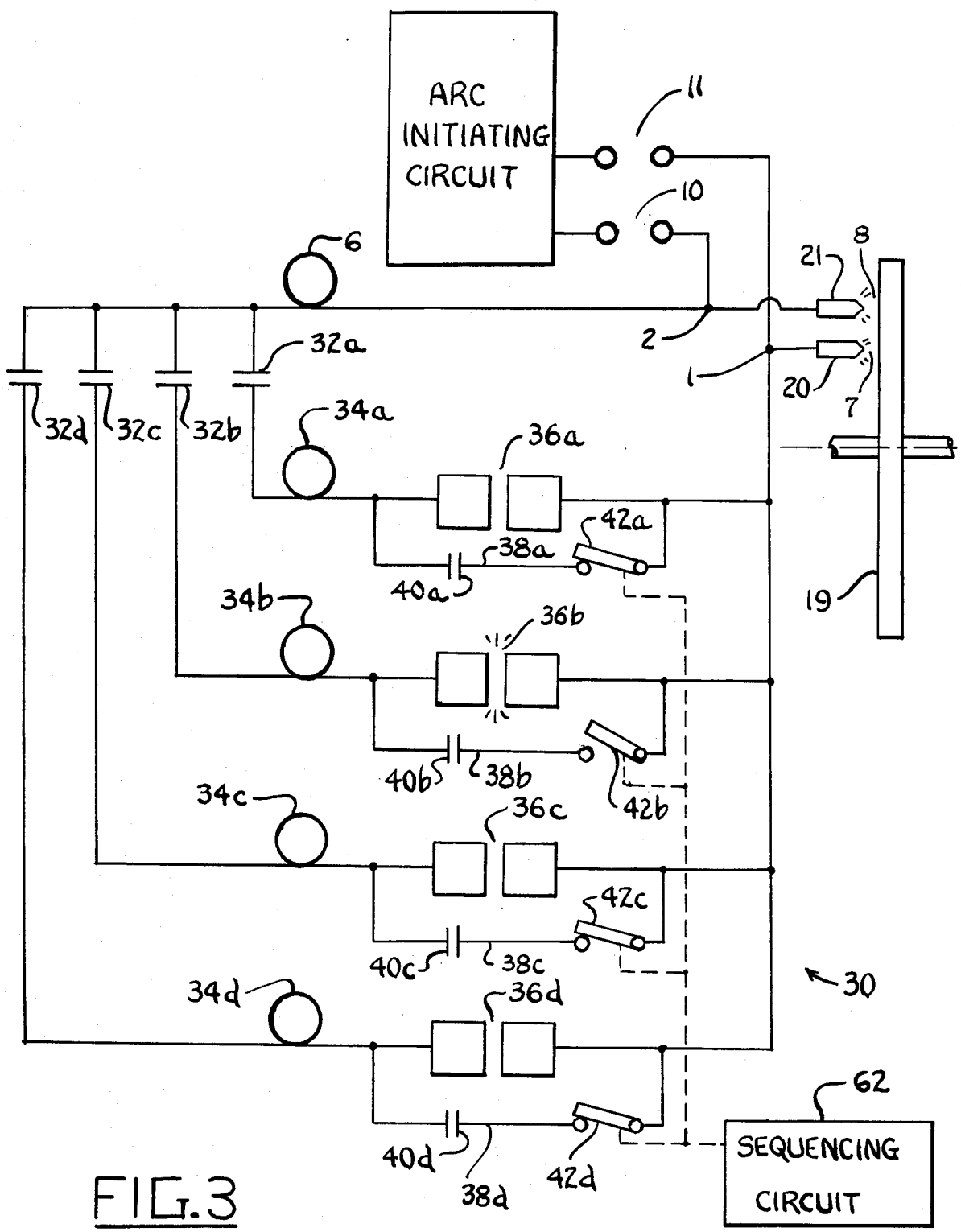
FIG. 3 is an electrical schematic diagram illustrating principles of the invention in a third embodiment.

FIG. 3 discloses a further embodiment 30 which illustrates the use of multiple capacitor banks. The illustrated embodiment is shown to comprise four such capacitor banks which are designated 32a, 32b, 32c, and 32d respectively. The balance mass workpiece 19, and the electrodes 20 and 21 which cooperatively define air gaps 7 and 8 respectively with workpiece 19, are identified by the same reference numerals as in the embodiments of FIGS. 1 and 2. Likewise the spark gaps 10 and 11 via which the arc initiating pulse is injected and the injection points 1 and 2 are identified by the same reference numerals. Details of the arc initiating circuit are not shown in FIG. 3, and they can be the same as shown in FIG. 1. Heavy conductor cables are connected from a common side of each capacitor bank through an inductor coil 6 which corresponds to inductor coil 6 shown in the preceding drawing figures.

Each of the capacitor banks is cooperatively associated with an individual choke coil, an individual "gap switch" and an individual control branch. For each of the respective capacitor banks 32a, 32b, 32c, and 32d, the corresponding choke coils are identified by the respective numerals 34a, 34b, 34c, and 34d, the associated gap switch by the respective numerals 36a, 36b, 36c, 36d, and the associated control branch by the respective numerals 38a, 38b, 38c, and 38d.

Each inductance coil identified by the base numeral 34 and the corresponding gap switch identified by the base numeral 36 are connected in series circuit from one side of the corresponding capacitor bank to electrode 20. The circuit connection includes appropriate conductors for the substantial magnitudes of current which occur during capacitor bank discharge.

Each gap switch 36 is shunted by a corresponding branch circuit identified by the base reference numeral 38. Each of the branch circuits 38a, 38b, 38c, and 38d, comprises a corresponding capacitor 40a, 40b, 40c, and 40d, in series with a corresponding control switch 42a, 42b, 42c, and 42d.

Figure 4:
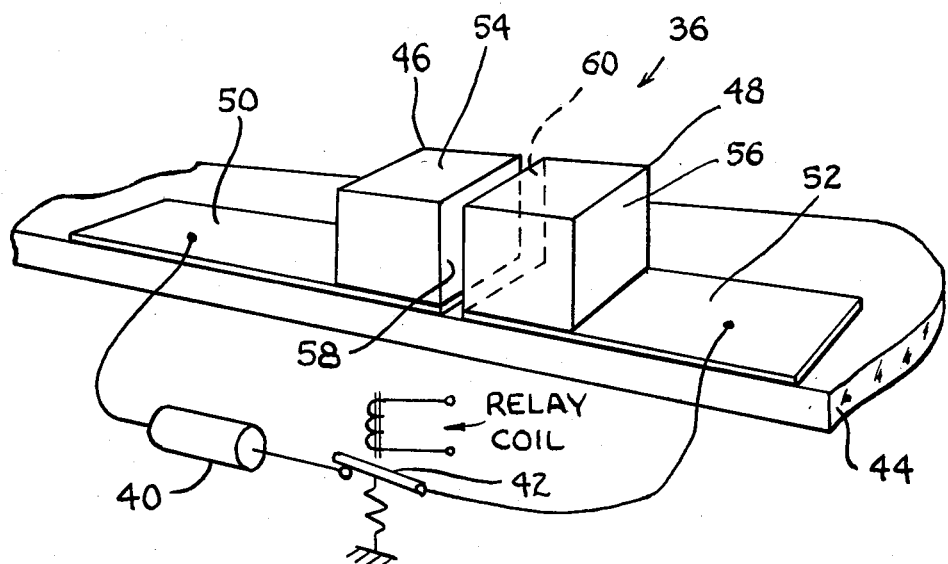
FIG. 4 is a perspective view of an embodiment of a portion of the circuit of FIG. 3.

FIG. 4 illustrates detail of a preferred construction for a gap switch. The illustrated gap switch comprises a non-conductive base 44 supporting a pair of switch contacts 46 and 48 each comprising a flat rectangular metal bus bar, 50 and 52 respectively, and a graphite block 54 and 56 respectively. The switch gap is cooperatively defined between the confronting faces 58 and 60 respectively of the two graphite blocks.

The gap switch permits switching very high currents without moving parts such as found in conventional switches. In other words, the gap switch functions as a "contactless contact" to turn on a current. Once the gap switch has been turned on, the current will continue to flow until the gap switch voltage falls below a certain magnitude, about 30 volts.

Although the exact size and configuration of a gap switch for any particular application will depend upon the requirements for that application, an illustrative construction comprises the gap being 0.020 inch wide. A typical surface area for a block conducting the discharge of a 20,000 microfarad capacitor bank charged to 300 volts is approximately 2 square inches for each face 58, 60. In order to turn on the gap switch, a high voltage (for example 3,000 volts or more) is applied across the gap. The ensuing spark creates an ionized path reducing the gap potential to about 30 volts. Any current source, such as a capacitor bank, maintaining more than 30 volts across the gap will be switched on; conduction through the gap switch continues as long as a potential greater than the 30 volts is sustained.

Graphite for blocks 54, 56 is preferable to metal because at ambient pressures graphite does not melt but rather sublimates, changing phase directly from solid to gas. Accordingly, the graphite blocks stay clean and function unlike metal, which due to high localized temperatures formed in the gap can produce pitting and molten globules that soon bridge the gap impairing the effectiveness of the gap switch, possibly even to the point of inoperability.

Moreover, the illustrated construction is advantageous in that the parallelism between faces 58 and 60 is automatically maintained because of the fact that the initiating spark and ensuing conduction will always begin at the point of minimum gap distance. This causes any high point on the gap surface to erode such that there is a uniform widening of the gap over course of use. By making one, or both, contacts relatively adjustable on base 44 toward each other, it is possible to reset, or adjust, the gap to eliminate widening. The frequency of gap adjustment is reduced by increasing the surface areas of the confronting block faces forming the gap, because the effects of erosion which widen the gap are spread over a larger surface area.

It will be appreciated that the showing of FIG. 4 is intended to be of a somewhat schematic nature. The actual construction will involve suitable means for the secure adjustable retention of the contacts on the base.

With this description of details of the gap switch as shown in FIG. 4 in mind, attention is redirected to the system shown in FIG. 3.

A capacitor bank is prevented from discharging through its corresponding gap switch 36 whenever the corresponding switch 42 is in closed position. In other words when an arc initiation pulse is injected from the arc initiation circuit at points 1 and 2, the pulse appears across all circuit branches which are effectively in parallel with the electrodes 20 and 21. Each capacitor bank 32, coil 34 and gap switch 36 is in parallel with the electrodes 20 and 21, the inductor coil 6 being in common with the four capacitor bank branches.

By maintaining a switch 42 closed, an arc initiating pulse is shunted around the corresponding gap switch 36 via the corresponding branch circuit 38. This prevents ionization of the switch gap, and hence the switch in effect remains open to the capacitor bank, preventing capacitor bank discharge.

Capacitor 40 in each of the branches is chosen to shunt only the high frequency, high voltage current (several milliamps) created in the branch by an arc initiating pulse while blocking current from the charged capacitor bank.

However when a switch 42 is opened the injection of an arc initiating pulse is not shunted around the corresponding gap switch but rather is effective to create ionization in the gap between the contacts 46, 48 of the gap switch thereby allowing the corresponding capacitor bank to discharge in the manner explained earlier whereby that capacitor is effective to sustain and augment the spark which has been initiated at the workpiece.

A desirable embodiment for each of the switches 42 comprises each switch being contacts of a normally closed relay. In other words each capacitor bank is under the control of an individual associated relay containing a set of contacts forming a switch 42. Hence with all such relay coils de-energized, all switches 42 are closed thereby maintaining all gap switches 36 open so that no capacitor bank can discharge to the workpiece.

Energization of any particular relay will be effective to open the corresponding switch 42 whereby that particular capacitor bank is enabled to discharge into the workpiece when an arc initiating pulse is injected via the spark gaps 1 and 2. The relay contacts forming each switch 42, when open, form an air gap greater than that of the associated gap switch 36.

By the selective operation of the individual relays it is possible to selectively couple the capacitor banks to the electrodes 20 and 21 in such a manner that each capacitor bank is sequentially placed on-line one at a time. In other words at any given time one capacitor bank is on-line and the other three are off-line. The off-line capacitor banks are recharged from a suitable power supply (not shown), such recharging taking place in a similar manner to that explained above in connection with FIGS. 1 and 2.

After a capacitor bank has discharged, its relay is de-energized causing the corresponding switch 42 to close. The next relay coil energized causes its switch 42 to open thereby placing the next capacitor bank on-line. Typically a capacitor bank will be placed on-line only after it has been fully recharged.

For the four capacitor bank system of FIG. 3, it is possible for the frequency of occurrence of arc at the workpiece to be four times greater than if only a single capacitor bank were used. Hence, the invention enables a more rapid balancing to be achieved with the substantial currents from the capacitor discharge being conducted through "contactless switching". Although the switches 42 are in the form of contacts, they do not carry the substantial magnitudes of arc discharge current from the capacitor banks; rather it is the gap switches which do so. As in the other embodiments, the arc initiating pulse is timed to occur at appropriate phase relationship of the rotating balance mass to produce erosion at a desired point on a workpiece, such as at the heavy spot in the manner explained above. A control circuit for sequentially placing the capacitor banks on-line one at a time is shown generally by the reference numeral 62. Various control formats may be employed as deemed appropriate, and it is contemplated that other than one-at-a-time on-line placement can be used.

Figure 5:
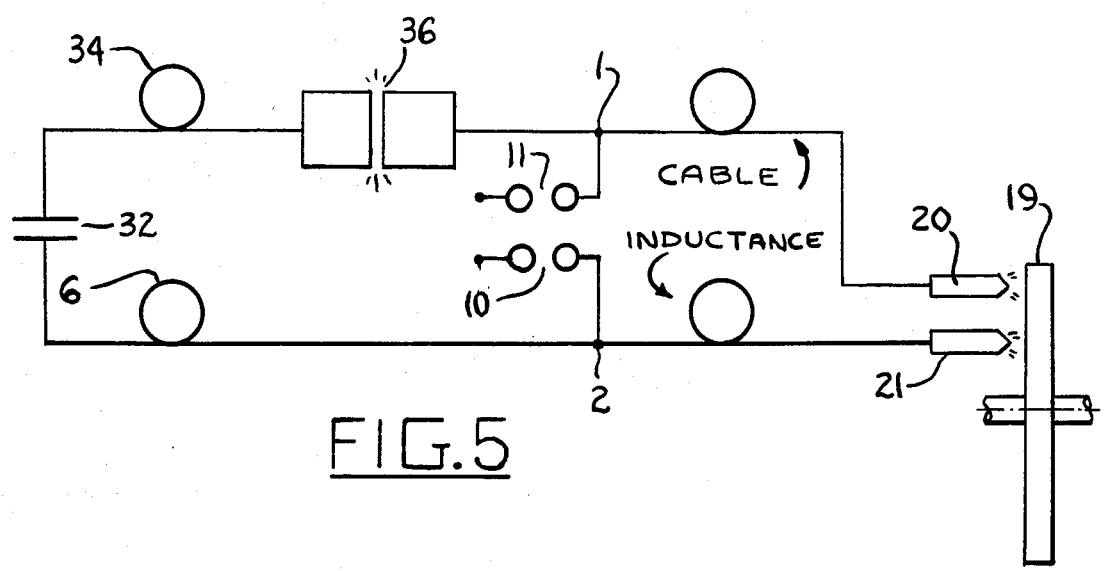
FIG. 5 is a schematic diagram of our equivalent circuit useful in explaining principles of the invention.

FIG. 5 illustrates an equivalent circuit when one of the capacitor banks is on-line. This takes into account all circuit inductance. The cable inductance (leads) in conjunction with choke coil inductance forms a voltage divider causing the trigger voltage to appear simultaneously across both the gap switch and the air gaps at the workpiece.

Although the gap switches and the workpiece gaps are disclosed as being in ambient air, any conduction medium across any gap may be substituted for air without departing from the principles of the invention. What this will do is change the parameters involved, but will not effect the underlying principles of the invention. The fact that certain data have been given above for representative constructions should not be construed as imparting a limitation to the scope of the invention. The design for any given system may be accomplished through application of conventional engineering principles in order to yield the appropriate sizes for the given application's requirement.

While a preferred embodiment of the invention has been disclosed, it will be appreciated that principles are applicable to other embodiments.

What is claimed is:

1. Balancing apparatus for balancing a rotary mass comprising means for rotating the mass and means for removing material from the mass while it is rotating to correct for unbalance comprising electrode structure defining a gap within which a portion of the unbalanced mass is disposed and via which an electric arc conducted to remove material from the mass, a power supply, coupling circuit means operatively coupling said power supply with said electrode structure for supplying electric current via said electrode structure across the gap to remove material from the mass, said power supply being incapable by itself of initiating electric arc discharge across the gap but being capable of sustaining and augmenting electric arc discharge across the gap once initiated, an arc discharge initiation circuit operatively coupled with said coupling circuit means for producing a high voltage, high frequency pulse which is effective to initiate electric arc discharge across the gap so that said power supply can become effective to sustain and augment the electric arc discharge thereby removing material from the mass, said coupling circuit means including means effective to prevent said power supply from impairing the effectiveness of said arc discharge initiation circuit in initiating the electric arc discharge yet allowing said power supply to sustain and augment the electric arc discharge without any substantial impediment of current flow from the Power supply once the electric arc discharge has been initiated, in which said power supply comprises one or more capacitor banks each of which discharges via said coupling circuit means to sustain and augment the electric arc discharge initiated by the high voltage, high frequency pulse and is rechargeable from a source of electric power after it discharges, said coupling circuit means comprising a control circuit operatively associated with each capacitor bank comprising a main conduction path from the corresponding capacitor bank to said electrode structure, said main conduction path including a pair of contacts separated by a gap and a control circuit branch comprising a reactive circuit element and a switch so organized and arranged that the switch selectively allows and disallows discharge of the corresponding capacitor bank through the corresponding pair of contacts to said electrode structure.

2. Balancing apparatus as set forth in claim 1 in which each reactive circuit element comprises a capacitor connected in series with the corresponding switch and wherein each control circuit branch is connected in parallel with the corresponding pair of contacts.

3. Balancing apparatus as set forth in claim 2 in which each switch comprises a set of mechanical contacts which are selectively operable to open and close and which when open have a gap greater than the gap between the corresponding pair of contacts.

4. Balancing apparatus as set forth in claim 3 in which each said pair of contacts comprises a pair of elements having confronting graphite faces separated by the corresponding gap.

5. Balancing apparatus as set forth in claim 4 in which each said element comprises a graphite block joined to a metal bus bar mounted on a base.

6. Balancing apparatus as set forth in claim 5 in which at least one element of each pair of elements to adjustable on said base relative to the other element to provide for resetting of the gap between the confronting graphite faces.

7. Balancing apparatus as set forth in claim 1 in which each switch comprises a set of normally closed contacts of a control relay.

8. Balancing apparatus as set forth in claim 7 in which each such relay is operated to alternately place each such capacitor bank on-line and off-line with said electrode structure, each such capacitor bank recharging from a source of electric power when off-line.

9. In a balancing apparatus wherein a capacitor bank discharges to deliver an electric arc discharge via electrode structure to a rotary mass which is being balanced for eroding material from the mass, the improvement for coupling the capacitor bank to the electrode structure comprising a main conduction path including a pair of contacts separated by a gap and a control circuit branch operatively associated with said pair of contacts and said capacitor bank, said control circuit branch comprising selectively operable means for disallowing conduction through said pair of contacts and gap when said capacitor bank is to charge from a source of electric power and for allowing conduction to be initiated between said pair of contacts across said gap by an arc initiating pulse from an arc initiation circuit when the capacitor bank is to discharge to erode material from the mass, the conduction between said pair of contacts continuing across said gap throughout the capacitor bank discharge to erode material from the mass.

10. In a balancing apparatus wherein a capacitor bank discharges to deliver an electric arc discharge via electrode structure to a rotary mass which is being balanced for eroding material from the mass, the improvement for coupling the capacitor bank to the electrode structure comprising a main conduction path including a pair of contacts separated by a gap and a control circuit branch operatively associated with said pair of contacts and said capacitor bank, said control circuit branch comprising selectively operable means for disallowing conduction through said pair of contacts and gap when said capacitor bank is to charge from a source of electric power and for allowing conduction to be initiated across said gap by an arc initiating pulse from an arc initiation circuit when the capacitor bank is to discharge to erode material from the mass, and in which said control circuit branch comprises a reactive circuit element and a selectively operable switch so organized and arranged that the switch selectively allows and disallows discharge of the capacitor bank through said pair of contacts and gap to the electrode structure by selectively allowing and disallowing the arc initiating pulse to be effective in initiating conduction across the gap.

11. The improvement set forth in claim 10 in which said reactive circuit element comprises a capacitor connecting in series with said switch and wherein said control circuit branch is connected across said pair of contacts in parallel with said gap.

12. The improvement set forth in claim 11 in which said switch comprises a set of mechanical contacts which are selectively operable to open and close and which when open have a gap greater than the gap between said pair of contacts.

13. The improvement set forth in claim 12 in which said pair of contacts comprise a pair of elements having confronting graphite faces.

14. The improvement set forth in claim 13 in which each element of said pair of elements comprises a graphite block joined to a metal bus bar mounted on a base.

15. The improvement set forth in claim 14 in which at least one element of said pair of elements is adjustable on said base in relation to the other element to provide for gap resetting between the confronting graphite faces.

16. The improvement set forth in claim 10 in which said switch comprises a set of normally closed contacts of a control relay.

17. A switch assembly for use in selectively allowing and disallowing the discharge of a capacitor bank into an electrode structure for delivering an electric arc discharge to a workpiece, said switch assembly comprising a pair of confronting contacts separated by a gap so that they are non-contacting and form a main conduction path between such a capacitor bank and electrode structure and, said switch assembly comprising a control circuit branch operatively coupled with said pair of contacts comprising a reactive circuit element and a selectively operable control switch so organized and arranged that said control switch selectively allows and disallows conduction across said pair of contacts through said gap by preventing an arc initiating pulse applied across such a capacitor bank and main conduction path from an associated arc initiating circuit from initiating conduction across said pair of contacts through said gap in one condition of said control switch and allowing conduction to be initiated in another condition of said control switch.

18. A switch assembly for use in selectively allowing and disallowing the discharge of a capacitor bank into an electrode structure for delivering an electric arc discharge to a workpiece, said switch assembly comprising a pair of confronting contacts separated by a gap for forming a main conduction path between such a capacitor bank and electrode structure, said switch assembly comprising a control circuit branch operatively coupled with said pair of contacts comprising a reactive circuit element and a selectively operable control switch so organized and arranged that said control switch selectively allows and disallows conduction across said pair of contacts through said gap by preventin an arc initiating pulse applied across such a capacitor bank and main conduction path from an associated arc initiating circuit from initiating conduction across said pair of contacts through said gap in one condition of said control switch and allowing conduction to be initiated in another condition of said control switch in which said reactive circuit element comprises a capacitor connected in series with said control switch and said capacitor and control switch are in parallel circuit relationship with said gap.

19. A switch assembly as set forth in claim 18 in which said pair of confronting contacts comprise confronting graphite faces separated by said gap.

20. A switch assembly as set forth in claim 19 in which said pair of confronting contacts are relatively adjustable on a base to provide for resetting of said gap.

21. A switch assembly as set forth in claim 18 in which said pair of confronting contacts each comprises a graphite block joined to a metal bus bar mounted on a base and in which at least one of said contacts is adjustable on said base relative to the other to provide for resetting of said gap.

* * * * *